(12) United States Patent
Bayar et al.

(10) Patent No.: US 9,055,557 B1
(45) Date of Patent: Jun. 9, 2015

(54) POLICY AND CHARGING CONTROL RULE PROGRAMMING AND LOOKUP IN WIRELESS CONNECTIVITY ACCESS NETWORKS

(75) Inventors: Roopa Bayar, San Jose, CA (US); Prasad Chigurupati, Cupertino, CA (US); Gazal Sahai, Santa Clara, CA (US); Jagadish Grandhi, Mountain View, CA (US); Dinesh Bakiaraj, Sunnyvale, CA (US); Gopi J. Krishna, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 523 days.

(21) Appl. No.: 13/430,452

(22) Filed: Mar. 26, 2012

(51) Int. Cl.
*H04W 72/00* (2009.01)
*H04W 76/02* (2009.01)

(52) U.S. Cl.
CPC .................................... *H04W 76/02* (2013.01)

(58) Field of Classification Search
CPC ..... H04M 15/66; H04M 15/00; H04M 15/64; H04M 15/765; H04M 3/2281; H04M 15/31; H04M 15/41; H04M 15/80; H04M 15/8016; H04M 15/81; H04M 2215/0112; H04M 2215/74
USPC ......................................................... 455/450
See application file for complete search history.

(56) References Cited

U.S. PATENT DOCUMENTS

| | | |
|---|---|---|
| 2008/0044181 A1 | 2/2008 | Sindhu |
| 2010/0217877 A1* | 8/2010 | Willars et al. ................. 709/228 |
| 2012/0060198 A1* | 3/2012 | Tremblay et al. ................. 726/1 |
| 2012/0290713 A1* | 11/2012 | Ellis .............................. 709/224 |
| 2013/0036032 A1* | 2/2013 | Cai et al. .......................... 705/30 |

OTHER PUBLICATIONS

"3GPP TS 29.212—Policy and Charging Control (PCC) over Gx/Sd reference point (Release 11)," Version 11.4.0, 3rd Generation Partnership Project, Technical Specification Group Core Network and Terminals, Mar. 2012, 181 pp.
Liu, "Efficient Mapping of Range Classifier into Ternary-CAM," in the Proceedings of the 10th Symposium on High Performance Interconnects (HOTI), Aug. 21-23, 2002, pp. 95-100.
Lakshminarayanan, "Algorithms for Advanced Packet Classification with Ternary CAMs," SIGCOMM'05, Aug. 21-26, 2005, 12 pp.
Gupta, "Packet Classification on Multiple Fields," Abstract, Jun. 7, 1999, 14 pp.
U.S. Appl. No. 12/182,619, by Jerome P. Moisand, filed Jul. 30, 2008.
U.S. Appl. No. 13/172,505, by Andrzej Szyszko, filed Jun. 29, 2011.

(Continued)

*Primary Examiner* — Kwasi Karikari
(74) *Attorney, Agent, or Firm* — Shumaker & Sieffert, P.A.

(57) ABSTRACT

In general, techniques are described for programming a set of one or more pre-defined rules within the forwarding plane of a packet gateway of a mobile service provider network and caching, within control plane, a group identifier that identifies the set of programmed, pre-defined rules. The control plane may match quality of service (QoS) information of incoming subscriber service requests with the group identifier and respective subsets of the set of programmed, pre-defined rules to rapidly associate service requests with already-programmed PCC rules and thereafter install, to the forwarding plane, subscriber service-specific actions for the PCC rules.

23 Claims, 7 Drawing Sheets

(56) References Cited

OTHER PUBLICATIONS

U.S. Appl. No. 13/174,216, by Ramaraj Balamurugan, filed Jun. 30, 2011.

"3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, Jun. 2010, 261 pp.

"3GPP TS 36.300—Evolved Universal Terrestrial Radio Access (E-UTRA) and Evolved Universal Terrestrial Radio Access Network (E-UTRAN)," Release 10, 3rd Generation Partnership Project, Technical Specification Group Radio Access Network, Jun. 2010, 183 pp.

"3GPP TS 23.203—Policy and Charging Control Architecture, (Release 10)," Version 10.1.0, 3rd Generation Partnership Project, Technical Specification Group Services and System Aspects, Sep. 2010, 132 pp.

* cited by examiner

POLICY AND CHARGING CONTROL RULE PROGRAMMING AND LOOKUP IN WIRELESS CONNECTIVITY ACCESS NETWORKS

TECHNICAL FIELD

The invention relates to mobile networks and, more specifically, to policy and charging control within mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet Protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical mobile service provider network, or mobile network, includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

The increasing number and bandwidth requirements of services available to mobile devices pressures available mobile network resources. Policy and charging control (PCC) provides network operators with the means to manage service connections to ensure an efficient utilization of core, transport, and radio network resources. Different services, such as Internet, E-mail, voice, and multimedia, have different quality of service (QoS) requirements that, moreover, may vary by user. To manage service connections in a consistent manner for a mobile network that simultaneously carries multiple different services for multiple users, PCC provides a centralized control to determine an appropriate transport path for services, determine QoS requirements for the services, differentiate charging on a per-PCC rule basis, and determine resource allocation necessary to ensure QoS characteristics of transport paths sufficient to meet the QoS requirements for the various services.

In an LTE network, the PDN gateway device, or PGW implements a Policy and Charging Enforcement Function (PCEF) using packet filters to map Internet Protocol (IP) traffic onto respective bearers and/or to identify IP traffic for charging. Each bearer terminated by the PGW is associated with a PCC Rule that has one or more Traffic Flow Templates or traffic flow 5-tuples (e.g., IP source, IP destination, source port, destination port, protocol) that map the traffic to the bearer. While typically created upon establishing a new bearer, the PGW may modify a bearer rule while the bearer remains active to add or remove filters. For example, when a user requests a new service, the PGW may add filters corresponding to the service to the rule of the bearer that provides the required QoS characteristics for the service. The PGW may then map incoming service data traffic for the session to the bearer using the TFT and forward the service data traffic according to the bearer characteristics. Besides bearer identification, other filter actions may include packet drops, packet marking, and accounting, for example.

Filter definitions for requested services may be received by the PGW from a mobile device requesting services or from a device that implements a Policy Control and Charging Rules Function (PCRF). A PCRF sends filters to the PGW in the form of PCC rules that each includes a set of information, e.g., filters, enabling detection of a service data flow encompassing those packets associated with a session as well as parameters for policy control and/or changing control, such as QoS information. A PGW may designate a single bearer to carry traffic described by multiple such PCC rules that specify QoS information matching the QoS characteristics of the bearer. PCC rules dynamically provided by a PCRF response to service requests, for example, are "dynamic" PCC rules. In some cases, however, a network operator may statically configure PCC rules directly into the PCEF implemented by the PGW. Such PCC rules are referred to as "static" or "predefined" PCC rules.

SUMMARY

In general, techniques are described for programming a set of one or more pre-defined rules within the forwarding plane of a packet gateway of a mobile service provider network and caching, within control plane, a group identifier that identifies the set of programmed, pre-defined rules. The control plane may match quality of service (QoS) information of incoming subscriber service requests with the group identifier and respective subsets of the set of programmed, pre-defined rules to rapidly associate service requests with already-programmed PCC rules and thereafter install, to the forwarding plane, subscriber service-specific actions for the PCC rules.

For example, a local QoS policy configured in a PDN gateway (PGW) defines a set of one or more PCC rules for an access point name (APN) and associates different subsets of the PCC rules with different QoS characteristics, such as QoS Class Identifier (QCI) and Allocation and Retention Priority (ARP) values. The local QoS policy further defines an evaluation precedence order for the PCC rules by associating each of the rules with an evaluation precedence index. A PGW service unit configures the forwarding plane hardware of the PGW with the set of PCC rules, including associated filters, in their evaluation precedence order. The forwarding plane associates the set of PCC rules with a group identifier and a PCC rule map having ordered elements that correspond to the set of PCC rules and their evaluation precedence order. The forwarding plane hardware returns the group identifier and PCC rule map for the set of PCC rules to the service unit, which caches this information to a pre-defined rule cache.

Subscribers of the APN issue service requests for APN services toward the mobile service provider network, which are forwarded upon authorization by mobile service provider network elements to the PGW. The service unit receives the service requests and establishes forwarding paths for the sessions in the forwarding plane hardware. For each service request, the service unit maps the QoS information provided therein to a subset of the set of PCC rules defined by the local QoS policy. The service unit, using the information in the pre-defined rule cache, identifies a group identifier that is associated with a PCC rule map having at least every element of the subset of the set of PCC rules mapped to the service request. The service unit then generates a rule map corresponding to the subset of the set of PCC rules within the PCC rule map. As part of establishing a session that implements the requested services, the service unit installs the group identifier and generated rule map for the subscriber to the forwarding plane in conjunction with rule-specific actions for application by the forwarding plane to enforce QoS, gating, and/or charging control for the requested services.

The described techniques may provide one or more advantages. For example, identification of applicable, pre-programmed rules as described in the pre-defined rule cache may permit the service unit to avoid requesting, and the forwarding plane avoid searching for, an acceptable set of PCC rules already programmed within the forwarding plane. Instead, the service unit may query the pre-defined rule cache, which specifies one or more sets of PCC rules already programmed within the forwarding plane, to attempt to determine an acceptable set of PCC rules and a corresponding group identifier for the set. This may allow the packet gateway to more quickly establish sessions for requested services, thus improving the subscriber call setup rate, while also reducing storage requirements in the forwarding plane of the packet gateway by reusing existing filters of pre-programmed rule sets.

In one example, a method includes installing, to a forwarding unit of a gateway of a wireless connectivity access network that provides connectivity to an access point name of a packet data network, a rule set comprising a set of one or more pre-defined policy and charging control (PCC) rules for the access point name. The method also includes receiving, with a service unit of the gateway, a group identifier for the rule set from the forwarding unit. The method further includes receiving, with the service unit, a service request issued by a wireless device associated with a subscriber, wherein the service request specifies a requested service for a connectivity access network session for the subscriber. The method also includes installing, with the service unit to a session context of the forwarding unit, the group identifier and a rule map that together identify a subset of the set of pre-defined PCC rules for the requested service, wherein the session context is associated with the connectivity access network session for the subscriber.

In another example, a wireless connectivity access network gateway that provides connectivity to an access point name of a packet data network includes a forwarding unit and a session context stored by the forwarding unit and associated with a connectivity access network session for a subscriber. The gateway also includes a service unit that stores a local quality of service (QoS) policy comprising a set of one or more pre-defined policy and charging control (PCC) rules for the access point name, wherein the service unit installs, to the forwarding unit, a rule set comprising the set of pre-defined PCC rules, wherein the service unit receives a group identifier for the rule set from the forwarding unit. The gateway also includes a subscriber management daemon of the service unit that receives a service request issued by a wireless device associated with the subscriber, wherein the subscriber management daemon installs, to the session context, the group identifier and a rule map that together identify a subset of the set of pre-defined PCC rules for the requested service.

In another example, a non-transitory computer-readable medium stores instructions. The instructions cause one or more programmable processors to install, to a forwarding unit of a gateway of a wireless connectivity access network that provides connectivity to an access point name of a packet data network, a rule set comprising a set of one or more pre-defined policy and charging control (PCC) rules for the access point name. The instructions further cause the programmable processors to receive, with a service unit of the gateway, a group identifier for the rule set from the forwarding unit. The instructions further cause the programmable processors to receive, with the service unit, a service request issued by a wireless device associated with a subscriber, wherein the service request specifies a requested service for a connectivity access network session for the subscriber. The instructions further cause the programmable processors to install, with the service unit to a session context of the forwarding unit, the group identifier and a rule map that together identify a subset of the set of pre-defined PCC rules for the requested service, wherein the session context is associated with the connectivity access network session for the subscriber.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
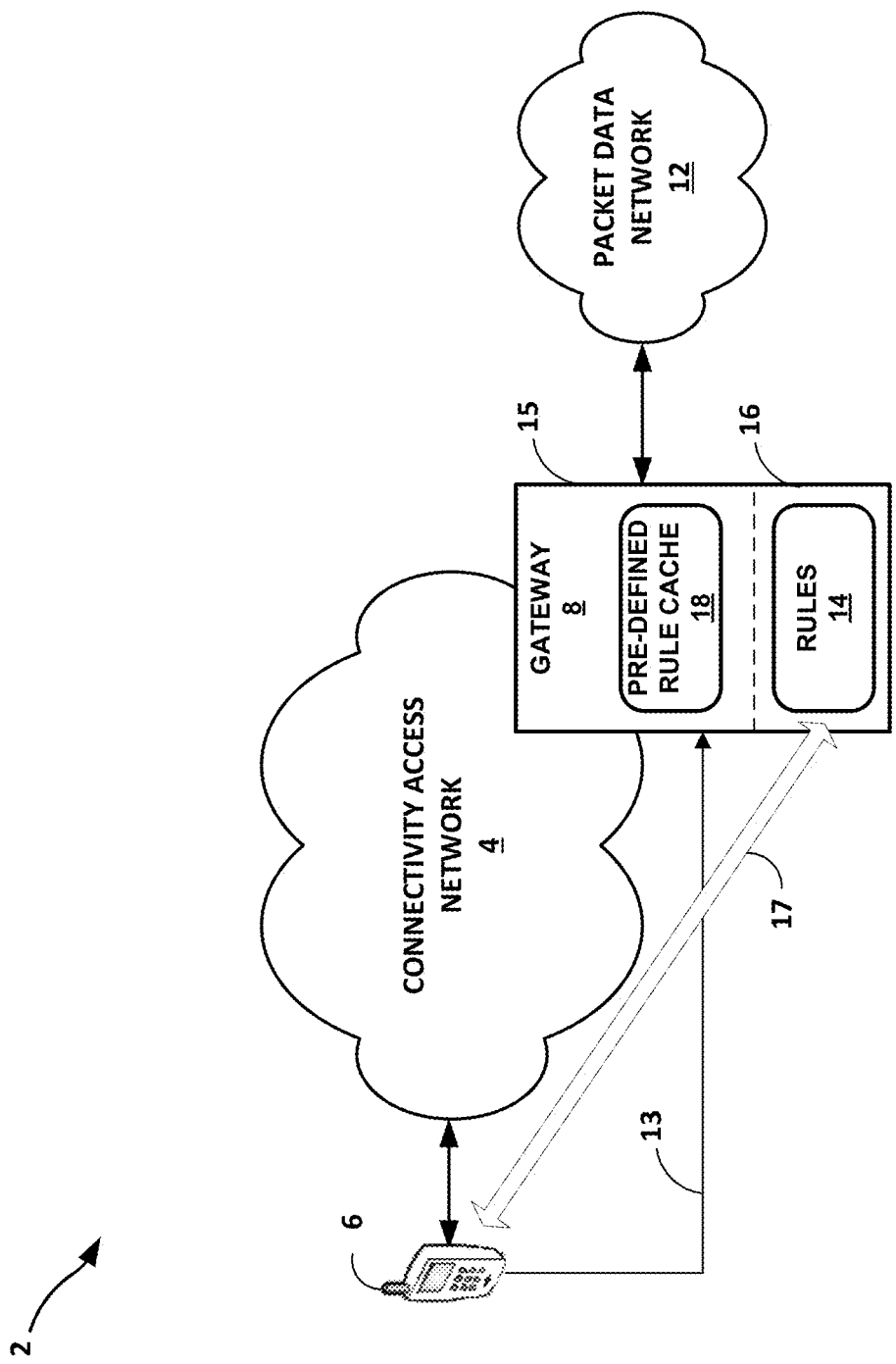
FIG. 1 is a block diagram illustrating an example network system that pre-programs pre-defined policy and charging control (PCC) rules in a network gateway for cached lookup and binding according to the techniques described herein.

FIG. 1 is a block diagram illustrating an example network system that pre-programs pre-defined PCC rules for cached lookup and binding according to the techniques described herein. In this example, network system 2 comprises packet data network (PDN) 12 coupled to connectivity access network 4 ("CAN 4") via gateway 8 of CAN 4. Packet data network 12 supports one or more packet-based services that are available for request and use by wireless device 6. As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates CAN 4, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Wireless device 6 is a wireless communication device that may comprise, for example, a mobile telephone, a laptop or desktop computer having, e.g., a 3G/4G wireless card, a wireless-capable netbook, a video game device, a pager, a smart phone, or a personal data assistant (PDA). Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments, as User Equipment (UE) or Mobile Stations (MS).

A service provider operates CAN 4 to provide network access, data transport and other services to wireless device 6. In general, CAN 4 may implement any commonly defined cellular network architecture including those defined by standards bodies, such as a Global System for Mobile communication (GSM) Association, a 3rd Generation Partnership Project (3GPP), a 3rd Generation Partnership Project 2 (3GGP/2), an Internet Engineering Task Force (IETF) and a Worldwide Interoperability for Microwave Access (WiMAX) forum. For example, CAN 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Connectivity access network 4 may, alternatively or in conjunction with one of the above, implement a code division multiple access-2000 ("CDMA2000") architecture. Connectivity access network 4 may, again as an alternative or in conjunction with one or more of the above, implement a WiMAX architecture defined by the WiMAX forum.

Connectivity access network 4 may comprise a core packet-switched network (not shown in FIG. 1) and one or more radio access networks (not shown in FIG. 1). A core packet-switched network of CAN 4 may comprise, for example, a general packet radio service (GPRS) core packed-switched network, an IP-based mobile multimedia core network, or an Evolved Packet Core (EPC). Wireless device 6 communicates with CAN 4 using a wireless communication link to one of the radio access networks of the connectivity access network. Radio access networks of CAN 4 may include, for example, for example, a GSM Radio Access Network (GRAN), a WiMAX radio access network, a UMTS Radio Access Network (UTRAN), and/or an evolution of a UTRAN known as an E-UTRAN. Connectivity access network 4 may further include a backhaul or transport network (not shown) that includes land-based transmission lines, frequently leased by a service provider for the connectivity access network, to transport user and control traffic between wireless device 6 and gateway 8. The backhaul network also includes network devices such as aggregation devices and routers.

Gateway 8 is a network device that operates as a gateway to PDN 12 and may comprise, for example, a Gateway GPRS Serving Node (GGSN), an Access Gateway (aGW), or a Packet Gateway (P-GW). Gateway 8 may comprise a router. While described herein with respect to one or more particular architectures for ease of illustration purposes, CAN 4 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Gateway 8 and other elements of connectivity access network 4 may, therefore, each represent an abstraction of devices found within any type of mobile network architectures.

Connectivity access network 4 establishes and operates bearers to transport user traffic, in the form of PDP packet data units (PDUs), referred to hereinafter as "packets." In general, a bearer is a set of network resources and data transport functions in CAN 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Wireless device 6 attaches to CAN 4, which establishes a CAN session and a default bearer to carry subscriber data or "user" traffic 17 for the wireless device as part of an attach procedure. The CAN session is an association between CAN 4 and wireless device 6 that is identifiable by a combination of a wireless device 6 PDP address and an Access Point Name (APN) for PDN 12. Besides establishing a default bearer, the attach procedure may trigger establishment, by CAN 4, of one or more dedicated bearers between gateway 8 and wireless device 6 to carry user traffic. Dedicated bearers operate according to a different set of quality of service (QoS) parameters and thus provide QoS differentiation to packet flows of various services engaged by wireless device 6. For example, various dedicated bearers may provide different guaranteed bit rates (GBR bearers) (or may not provide a guaranteed bit rate), maximum bit rates (MBRs), priority, packet delay budget, packet error loss rate, and allocation and retention priority (ARP) characteristics. Wireless device 6 may issue one or more service requests 13 each specifying QoS parameters for the service session requested and an APN of PDN 12. Such QoS parameters may include, for a requested service session, a QoS Class Identifier (QCI) and Allocation and Retention Priority (ARP) value. A particular bearer may transport subscriber data traffic 17 for multiple service sessions of a CAN session when the QoS characteristics of the bearer match the requirements of the service sessions. In an IP-based connectivity access network 4, a CAN session comprises an IP-CAN session.

Gateway 8 is a network device that implements policy and charging control (PCC) functionality for CAN 4. In this respect, gateway 8 may implement/represent a Policy and Charging Enforcement Function (PCEF) for CAN 4. An operator provisions gateway 8 with a local QoS policy for an APN of PDN 12 that includes one or more pre-defined PCC rules that each specify a set of information enabling the detection of a service data flow and providing policy control and/or charging control parameters. The pre-defined PCC rules may be applicable to all subscribers of the APN, including wireless device 6. Gateway 8 enforces service flow-based policy and charging control for the APN at least according to the PCC rules of the local QoS policy. Further details regarding policy and charging control are found in "3GPP TS 23.203—Policy and Charging Control Architecture (Release 10)," Version 10.1.0, 3rd Generation Partnership Project, Technical Specification Group Services and System Aspects, September 2010, which is incorporated herein by reference in its entirety.

A PCC rule includes a rule identifier that uniquely identifies the rule within a CAN session, service data flow detection information, charging information, and/or policy control information. Policy control information specifies parameters for gating control (i.e., permit/deny), QoS control, and QoS signaling. Service data flow detection information includes a precedence value and a service data flow template that specifies traffic mapping information to identify packet flows for a service session. Traffic mapping information may include one or more packet filters that include parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The set of packets detected by applying the service data flow template of a particular PCC rule are referred to as a service data flow. A service data flow may include packets for multiple service sessions. Packet filters of a service data flow template may be alternatively referred to herein as service data flow filters.

Gateway 8 associates service data flows (and, by extension, the corresponding PCC rule) to particular bearers for a CAN session during a binding process to ensure that packet flows within the service data flows receive an appropriate QoS from CAN 4. For a given PCC rule, gateway 8 analyzes policy control information therein to determine whether an existing bearer for the relevant CAN session is sufficient to provide the requisite QoS. If not, gateway 8 initiates establishment of a new, suitable bearer. Gateway 8 creates bindings between (or "binds") one or more service data flows and the bearer that matches the QoS specified in corresponding PCC rules for the service data flows. A particular bearer established to provide a particular QoS scheme may thus carry packet flows matched by one or more PCC rules.

Gateway 8 evaluates service data flow templates of corresponding PCC rules for application to packets traversing the CAN 4 boundary in the order of the corresponding PCC rules precedence. PCC rules precedence is specified by the precedence value in the service data flow detection information of each respective PCC rule. During evaluation of a packet, matching a packet filter in a service data flow template for a PCC rule causes gateway 8 to map the packet to the bearer to which the PCC rule is bound. A control plane 15 of gateway 8 programs PCC rule filters into forwarding plane 16 for application of the PCC rules to subscriber data traffic 17 by forwarding plane 16 components.

In accordance with techniques of this disclosure, control plane 15 of gateway 8 programs a set of pre-defined PCC rules 14 (illustrated as "rules 14") that define a local QoS policy for an APN of PDN 12 into forwarding plane 16, which returns a group identifier (alternatively, a "filter group identifier") for the set of pre-defined PCC rules 14. For example, control plane 15 of gateway 8 may generate a pre-defined rule cache 18 that identifies the set of pre-defined PCC rules 14 and associates the set with the group identifier returned by forwarding plane 16. Control plane 15 may then match quality of service (QoS) information of subsequent incoming subscriber service request 13 to the group identifier and a subset of the set of programmed, pre-defined PCC rules 14 that map, in accordance with the local QoS policy, to bearers offering the required QoS. In this way, control plane 15 associates service request 13 with the subset of the set of programmed, pre-defined PCC rules 14 and then installs, to forwarding plane 16, subscriber service-specific policy control and charging actions for each element in the subset of pre-defined PCC rules 14 to, for example, map the PCC rules 14 to one or more bearers that are to carry respective subscriber data traffic 17 matching PCC rules 14. By permitting control plane 15 to avoid requesting, and permitting forwarding plane 16 to avoid searching for, an acceptable set of PCC rules already programmed within forwarding plane 16, gateway 8 may be able to more quickly establish service sessions for requested services and improve the subscriber call setup rate for CAN 4.

Figure 2:
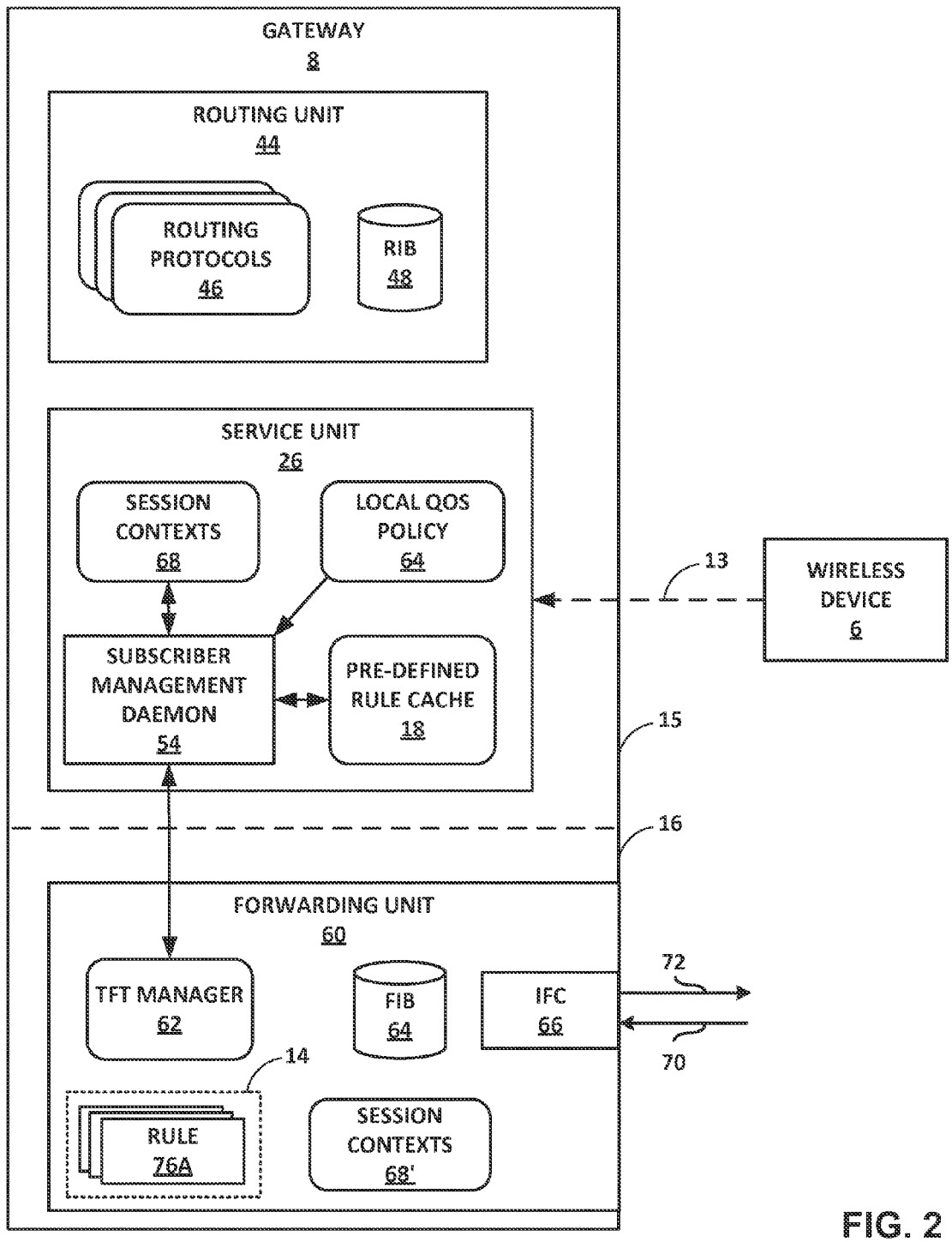
FIG. 2 is a block diagram illustrating an example connectivity access network gateway that establishes service sessions for subscribers by identifying pre-programmed, pre-defined PCC rules in a control plane of the gateway.

FIG. 2 is a block diagram illustrating an example connectivity access network gateway that establishes service sessions for subscribers by identifying pre-programmed, pre-defined PCC rules in a control plane of the gateway. Gateway 8 of FIG. 2 may represent an example instance of gateway 8 of FIG. 1 and is divided into two logical or physical "planes" to include a first control plane 15 and a second "data" or "forwarding" plane 16. That is, gateway 8 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 15 is a decentralized control plane in that control plane functionality is distributed among routing unit 44 and a subscriber management service unit 26 ("service unit 26"). Data plane functionality and packet forwarding functionality of data plane 16 is provided in this example by forwarding unit 60. Each of routing unit 44, service unit 26, and forwarding unit 60 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 44, service unit 26, and forwarding unit 60 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In some examples, a switch and/or one or more network links (not shown in FIG. 2) couples routing unit 26, service unit 26, and forwarding unit 60 to deliver data units and control messages among the units. The switch may include an internal switch fabric or cross-bar, bus, or link. The network links may include an 100 Mbps Ethernet link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 44 executes the routing functionality of gateway 8. In this respect, routing unit 44 represents hardware or a combination of hardware and software that implements routing protocols 46 by which routing information stored in a routing information base 48 ("RIB 48") may be determined. RIB 48 may include information defining a topology of a network, such as CAN 4 and/or PDN 12 of FIG. 1. Routing unit 44 may resolve the topology defined by routing information in RIB 48 to select or determine one or more routes through the network. Routing unit 44 may then update data plane 16 with these routes, where forwarding unit 60 of data plane 16 stores these routes as forwarding information base 64 ("FIB 64"). Further details of one example embodiment of a router are found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," which is incorporated herein by reference.

Forwarding plane (alternatively, "data plane") 16 represents hardware or a combination of hardware and software that forward network traffic in accordance with forwarding information. In the example of gateway 8 of FIG. 2, forwarding plane 16 includes forwarding unit 60 that provides high-speed forwarding of network traffic received by interface card 66 ("IFC 66") via inbound links 70 to outbound links 72. IFC 66 may couple to multiple inbound links 70 and outbound links 72 by respective ports of the IFC. Forwarding unit 60 may include one or more packet forwarding engines ("PFEs") (not shown) coupled to interface card 66 and may represent, for example, a dense port concentrator (DPC), modular port concentrator (MPC), flexible physical interface card (PIC) concentrator (FPC), or another line card, for example, that is insertable within a gateway 8 chassis or combination of chassis. In some examples, gateway 8 may include a plurality of forwarding units. In such examples, one of the forwarding units may operate as an "anchor" to perform data processing, including PCC rule processing and application described in this disclosure, with respect to subscriber data traffic received and/or output by one or more other forwarding units of the gateway. The anchor forwarding unit may not include an external interface card. However, for simplicity, a single forwarding unit 60 is described as receiving, processing, and outputting subscriber data traffic on external interfaces.

Subscriber management service unit 26 ("service unit 26") of control plane 15 provides CAN session setup and management for gateway 8. Service unit 26 may represent, for example, a packet forwarding engine (PFE) or a component of physical interface card insertable within a chassis of gateway 8. The physical interface card may be, for instance, a multi-services dense port concentrator (MS-DPC). Service unit 26 may also each represent a co-processor executing on a routing node, such as routing unit 44. That is, in some examples, functionality of service unit 26 as described herein may be executed by routing unit 44. Service unit 26 may be alternatively referred to as a "service PIC" or "service card." In some examples, gateway 8 may include a plurality of service units.

Subscriber management daemon 54 of service unit 26 establishes CAN sessions requested by a connectivity access network in which gateway 8 is located and manages the sessions once established. Subscriber management daemon 54 stores session data, received in control plane protocol messages received by subscriber management daemon 54 or allocated by subscriber management daemon 54, for one or more sessions managed by service unit 26 in session contexts 68 (alternatively, "PDP contexts 68"). A session context stored in session contexts 68 for a CAN session in which a wireless device participates may include, for example, the PDP address allocated by the CAN for the wireless device for use in sending and receiving user packets, routing information used by forwarding unit 60 in forwarding user packets such as tunnel endpoint identifiers (TEIDs) and identifiers/addresses for downstream nodes, the APN for the CAN session, and quality of service (QoS) profiles. In accordance with techniques of this disclosure, a session context stored in session contexts 68 for a CAN session may also include a group identifier and a rule map that together identify a set of pre-defined PCC rules 14 installed to forwarding unit 60.

As a control plane anchor for CAN sessions, service unit 26 manages aspects of configuration of forwarding unit 60 for constructing subscriber-specific forwarding paths for processing and forwarding data traffic from the mobile devices. For example, service unit 26 may program session contexts 68 to forwarding unit 60 for storage in session contexts 68' (alternatively, "PDP contexts 68'). Forwarding unit 60 may receive packets of subscriber data traffic, map the packets to a session context in session contexts 68', and apply forwarding constructs to forward the packets according to the session context data. For example, forwarding of downstream user packets by forwarding unit 60 for a particular session may include encapsulating the user packets using the GPRS Tunneling Protocol (GTP) and setting the specified downstream TEID for the session within a GTP header. Example details on subscriber management units 26 constructing subscriber-specific forwarding paths within forwarding unit 60 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Local Quality of Service (QoS) policy 64 of service unit 26 may be pre-configured by an operator of a connectivity access network to specify pre-defined QoS control on a per service data flow basis in gateway 8 for one or more APNs of PDNs to which gateway 8 offers service connectivity. In some examples, service unit 64 may apply local QoS policy 64 in conjunction with PCRF-provided QoS information, such as dynamic PCC rules, to be enforced for a service data flow. Local QoS policy 64 specifies one or more pre-defined PCC rules that each includes one or more filters enabling detection of a service data flow and may further provide parameters for policy control and/or charging control.

Subscriber management daemon 54 installs PCC rules specified in local QoS policy 64 to forwarding unit 60 as PCC rules 14, a set of one or more PCC rules 76A-76N (collectively, "PCC rules 76") configured in forwarding unit 60 to maintain the precedence ordering defined by local QoS policy 64. In this example, each dedicated bearer established by subscriber management daemon 54 may be associated with up to 16 PCC rules, which forwarding unit 60 applies in the precedence ordering defined by local QoS policy and configured within forwarding unit 60. Responsive to installation of PCC rules by subscriber management daemon 54, traffic filter template (TFT) manager 62 returns a group identifier that corresponds to the full set of pre-defined PCC rules 14. In some instances, TFT manager 62 additionally returns a PCC rule map having elements that each corresponds to one of PCC rules 76. In some instances, service unit 26 generates a PCC rule map having elements each corresponding to one of PCC rules 76. Service unit 26 caches the group identifier and PCC rule map to pre-defined rule cache 18.

Local QoS policy 64 further associates each of the pre-defined PCC rules with one or more (e.g., a combination) QoS parameter values, such as QCI, ARP, MBR, and/or GBR values. For example, local QoS policy 64 may associate a subset of the pre-defined PCC rules with a QoS profile defined by QCI=0 and ARP=1. Local QoS policy 64 may also associate a different subset of the pre-defined PCC rules with a QoS profile defined as QCI=1 and ARP=1.

Service unit 26 receives service requests received at IFC 66 and forwarded by forwarding unit 60 and creates corresponding service sessions for the CAN session using techniques of this disclosure to apply a QoS defined by local QoS policy 64. In the illustrated example, service unit 26 receives service request 13 issued by wireless device 6 and forwarding by elements of a connectivity access network to gateway 8. Service request 13 may include, for instance, a Create Session Request message or Modify Bearer Request message transmitted by a Serving Gateway (S-GW) to gateway 8 operating as a PGW of an EPC of an LTE network or a Create PDP Context Request transmitted by an SGSN to gateway 8 operating as a GGSN of a GPRS packet-switched network. Service request 13 includes an Access Point Name that identifies a packet data network and may in some instances further identify one or more requested services (e.g., Internet, WAP, or multimedia messaging service (MMS)) provided by the packet data network. Service request 13 also specifies QoS information defining a QoS to be applied by gateway 8 and other elements of the connectivity access network to subscriber data traffic associated with the one or more requested services. For example, service request 13 may specify QoS profiles for various services defined by QCI=0 and ARP=1 and QCI=1 and ARP 1, as in the above examples for local QoS policy 64, or by any other combination of QoS parameter values.

Subscriber management daemon 54 handles service request 13 by applying local QoS policy 64 to identify a subset of PCC rules 76 for classifying subscriber data traffic for the CAN session to the one or more requested services. That is, subscriber management daemon 54 applies local QoS policy 64 to determine the subset of the pre-defined PCC rules associated with the QoS profiles for the requested services. Depending on the active PCC rules, subscriber management daemon 54 may additionally initiate establishing a dedicated bearer for each of the requested services by, for example, sending one or more Create Bearer Request messages each specifying a QoS profile for a corresponding service/dedicated bearer to downstream elements of the connectivity access network.

Upon identifying the subset of PCC rules 76 to be applied to subscriber data traffic, subscriber management daemon 54 queries pre-defined rule cache 18 to identify a group identifier and corresponding PCC rule map associated with at least every element of the identified set. Subscriber management daemon 54 generates a rule map for the CAN session that specifies each rule of the PCC rule map that is included in the subset of PCC rules to be applied to subscriber data traffic associated with the CAN session. Subscriber management daemon 54 stores the group identifier and rule map to a session context in session contexts 68 for the CAN session and additionally installs forwarding constructs to the forwarding unit 60 that include the group identifier and rule map to a corresponding session context structure in session contexts 68'. Still further, subscriber management daemon 54 installs subscriber service-specific policy control and charging actions for each rule of the PCC rule map that is included in the subset of PCC rules to be applied to the subscriber data traffic. Such actions may include charging, gating, and/or forwarding, by forwarding unit 60, packets of a service data flow for PCC rule using a particular dedicated bearer.

Forwarding unit 60 receives subscriber data traffic associated with the CAN session and uses the group identifier and rule map installed to the corresponding session context structure in session contexts 68' to identify the subset of PCC rules 76 for application. Forwarding unit 60 applies the identified subset in their precedence order to subscriber data traffic for the CAN session and executes actions mapped to matching PCC rules. As a result, forwarding unit 60 may substantially reduce storage requirements for filters of PCC rules by reusing such filters across multiple CAN sessions of the APN. In addition, locally caching, in pre-defined rule cache 18, the group identifier and rule map for the set of applicable PCC rules 76 for the APN may reduce and, in some instances, eliminate a requirement of forwarding unit 60 to search already-programmed PCC rules for a suitable set of PCC rules. Rather, service unit 26 may quickly identify a suitable subset of PCC rules within the set of pre-defined PCC rules that accords with QoS profiles for requested services and associate the subset with the CAN session and appropriate actions for the requested services in forwarding unit 60.

Figure 3:
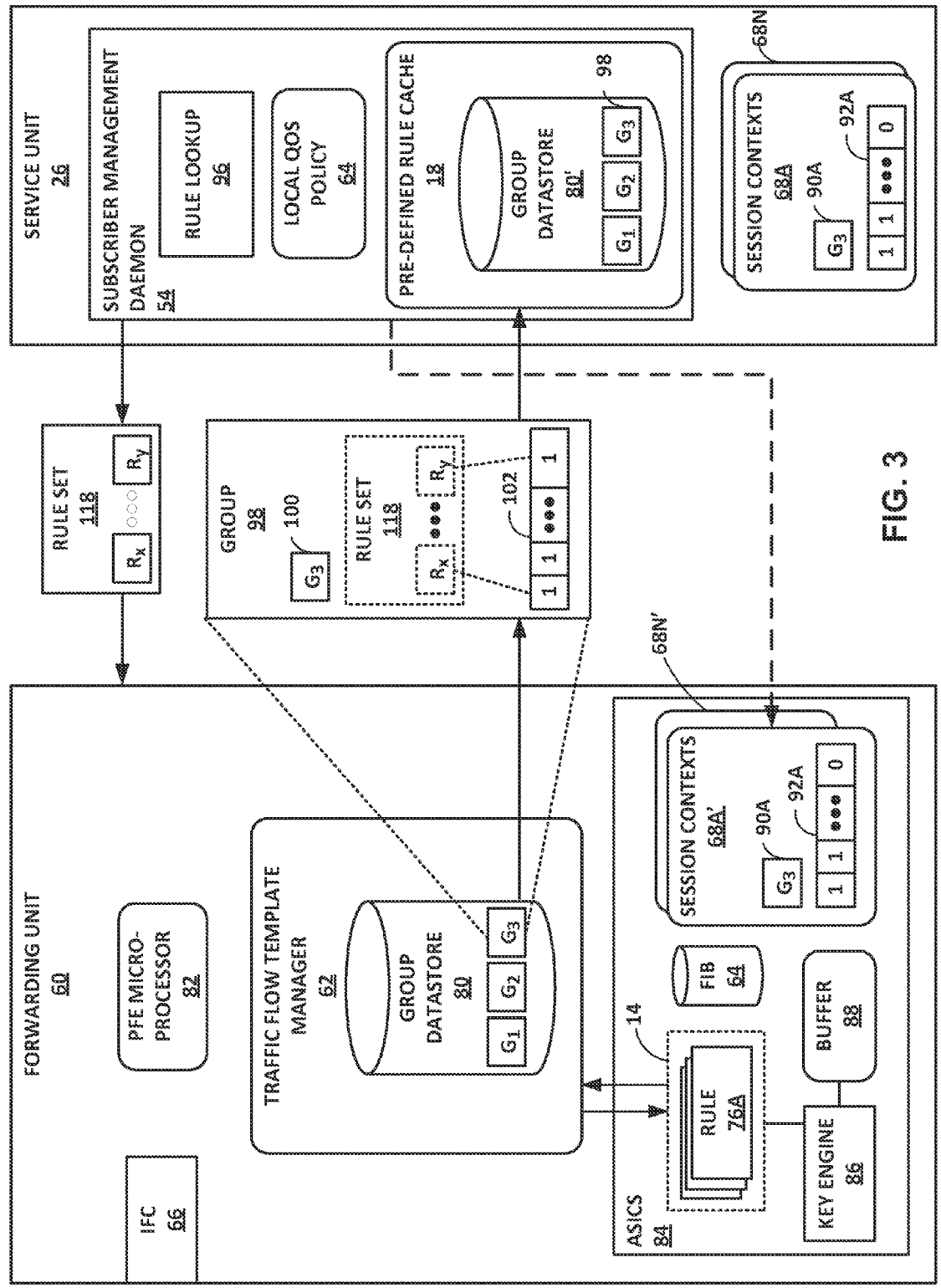
FIG. 3 is a block diagram illustrating an example service unit of a gateway that pre-programs a forwarding unit with a set of pre-defined PCC rules and locally caches the set of PCC rules for PCC rule lookup in accordance with techniques described in this disclosure.

FIG. 3 is a block diagram illustrating an example service unit of a gateway that pre-programs a forwarding unit with a set of pre-defined PCC rules and locally caches the set of PCC rules for PCC rule lookup in accordance with techniques described in this disclosure. Example forwarding unit 60 includes a packet forwarding engine (PFE) microprocessor 82 to manage ASICs 84 by, among other functions, executing traffic flow template (TFT) manager 62 to manage receipt, identification, and programming of PCC rules to ASICs 84. PFE microprocessor 82 may execute a microkernel to provide an operating environment for TFT manager 62. TFT manager 62 may include one or more multi-threaded processes that each encompass multiple threads.

Traffic flow template manager 62 receives, for application to subscriber data traffic associated with a CAN session, rule sets each specifying one or more PCC rules from service unit 26 and programs the PCC rules of each rule set to ASICs 84 for application to the subscriber data traffic. As the number of subscribers and CAN sessions increases, storage resources of forwarding unit 60 may be consumed by filters of PCC rules programmed in memory for each subscriber. In some examples, such storage resources may include high-speed storage such as Reduced-Latency Dynamic Random Access Memory (RLDRAM) or Ternary Content Addressable Memory (TCAM). Such high-speed storage may have limited storage capacity and in some cases is costly. As a result, TFT manager 62 may, where overlapping PCC rules of rule sets exist, associate already-programmed PCC rules with the CAN session to reuse filters of the corresponding service data flow templates across multiple CAN sessions for respective subscribers. PCC rule filter reuse is described further in U.S. patent application Ser. No. 13/174,216, filed Jun. 30, 2011, entitled "FILTER SELECTION AND REUSE," which is incorporated herein by reference.

TFT manager 62 stores and maintains group datastore 80 to associate rule sets with group indices. That is, group datastore 80 represents an associative data structure maintains a mapping between a group index and one or more PCC rules for the group index. TFT manager 62 receives rule sets from subscriber management daemon 54 in requests for PCC rule installation. When a received rule set matches a subset of a rule set associated with a group index in group datastore 80, TFT manager 62 returns the group index to subscriber management daemon 54 along with a PCC rule map, an array (e.g., a bit mask) indicating those PCC rules in the rule set associated with the group index that match and thus apply to implement the received rule set for the associated CAN session. Subscriber management daemon 54 may store the group index and the received PCC rule map for a CAN session to the corresponding session context in session contexts 68. Subscriber management daemon 54 may install the group index and the received PCC rule map for a CAN session to the corresponding session context in session contexts 68'. In some cases, a size of a set of PCC rules associated with any one group index is subject to an upper bound. In some instances, the upper bound is 11 or 32.

Forwarding unit 84 includes ASIC-based packet processors ("ASICs 84") that map packets to subscriber records and execute processing paths for received packets. ASICs 68 include one or more programmable application-specific integrated circuits having key engine 86 that executes microcode (or "microinstructions") to control and apply fixed hardware components of ASICs 84 to process packet "keys." A packet key includes packet fields and other parameters that determine a flow of packet processing for the packet along an internal processing path that references elements of FIB 64 and rules 14. Key engine 86 includes buffer 88 to store session context data and packet field data for corresponding packets that the key engine is currently processing. Some instances of ASICs 84 may include a plurality of key engines each having an associated buffer.

In accordance with the described techniques, subscriber management daemon 54 queries local QoS policy 64 to obtain a set of one or more pre-defined PCC rules configured for an APN to which gateway 8 offers connectivity. Subscriber management daemon 54 issues the set of pre-defined PCC rules to forwarding unit 60 as rule set 118 in a create rule set message. In some cases, the size of the set of pre-defined PCC rules exceeds the upper bound for a size of a rule set in forwarding unit 60. In such cases, subscriber management daemon 54 may issue multiple create rule set messages each specifying different combinations of PCC rules in the set of pre-defined PCC rules.

TFT manager 62 installs a representation of the PCC rules specified by rule set 118 as rules 76 of rules 14 of ASICs 84. Rules 14 may be stored within ASICs 84 as RLDRAM or TCAM, for example. TFT manager 62 generates (or receives from ASICs 84) a group index that is a reference to an object that references rules 76. In addition, TFT manager 62 generates PCC rule map 102, a bit mask indicating those PCC rules in rules 76 associated with the group index that may be applied by ASICs 84 to implement rule set 118. In some instances, PCC rule map 102 elements specify rule indices for rules programmed to forwarding unit 60. In some cases, all bits in PCC rule map 102 are set to indicate all of the PCC rules in rule set 118 have an associated element in the bit mask. TFT manager 62 returns a create rule set response message that includes group 98 specifying group index 100 that is a reference in forwarding unit 60 to an object that references rules 76 and further specifying PCC rule map 102.

The create rule set message for rule set 118 is not issued by subscriber management daemon 54 for any particular CAN session. Rather, subscriber management daemon 54 stores group 97 to pre-defined rule cache 18 that includes group datastore 80', which in some instances represents a shadow copy of group datastore 80 of TFT manager 62. Pre-defined rule cache 18 stores one or more groups specifying group indices and PCC rule maps for pre-programmed, pre-defined PCC rules installed to ASICs 84. For example, pre-defined rule cache 18 stores group 98 returned by TFT manager 62.

Subscriber management daemon 54 receives service requests (e.g., service request 13 of FIG. 2) from wireless devices. For each service request, rule lookup module 96 (illustrated as "rule lookup 96") determines the PCC rules to be applied to the one or more requested services based on the corresponding QoS profiles included in the service request. Subscriber management daemon 54 then queries pre-defined rule cache 18 for a group associated with a set of rules that includes at least all of the PCC rules for the requested services. If such a group is identified within pre-defined rule cache 18, subscriber management daemon 54 obtains the group index identifying the group within forwarding unit 60 and additionally generates a session-specific PCC rule map based at least on the PCC rule map associated with the group (the "group PCC rule map"). The session-specific PCC rule map specifies those rules identified in the group PCC rule map that apply for the CAN session established in accordance with the service request.

For example, rule lookup 96 may determine, based on local QoS policy 64, that a strict subset of PCC rules associated with group 98 are to be applied by forwarding unit 60 to implement filtering for one or more services of a CAN session associated with session contexts 68A. Subscriber management daemon 54 generates PCC rule map 92A, a session-specific rule map for the CAN session that has bit elements set for bit elements of PCC rule map 92A corresponding to the strict subset of PCC rules to be applied in the CAN session, where the full set of PCC rules is associated with group 98 as rule set 118 indicated by PCC rule map 102. Subscriber management daemon 54 adds PCC rule map 92A to session context 68A for the CAN session and also sets group index 90A for session context 68A to the value of group index 100 of group 98. In this way, subscriber management daemon 54 uses pre-defined rule cache 18 to associate the CAN session with the PCC rules specified in location QoS policy 64 for the services requested for the CAN session. Subscriber management daemon 54 may therefore avoid requesting TFT manager 62 to search for a suitable group in group datastore 80 for rule sets for each subscriber. Because searching for a suitable group in group datastore 80 may necessitate locking the data structure for each subscriber, and because gateway 8 may service on the order of millions of subscribers, the techniques may greatly reduce processing time for rule set programming in forwarding unit 60.

In some instances, pre-defined rule cache 18 may not include a group associated with a rule set that includes at least all of the PCC rules for requested services in a service request. In such instances, subscriber management daemon 54 may send a create rule set request with the PCC rules to TFT manager 62 and request lookup/installation.

Subscriber management daemon 54 maps active PCC rules identified by PCC rule map 92A to subscriber-specific actions to be applied by forwarding unit 60 to respective service data flows to enforce QoS, gating, and/or charging control for the service sessions in accordance with local QoS policy and/or subscriber-specific policies received, for instance, from a PCRF. Subscriber management daemon 54 installs forwarding constructs to session contexts 68A' to ASICs 84 that include objects for implementing session contexts 68A. When forwarding unit 60 receives packets associated with the CAN session of session contexts 68A', key engine 86 may add group index 90A and PCC rule map 92A to buffer 88 and process the packets by matching the packets to PCC rules identified by the group index 90A and PCC rule map 92A.

Figure 4:
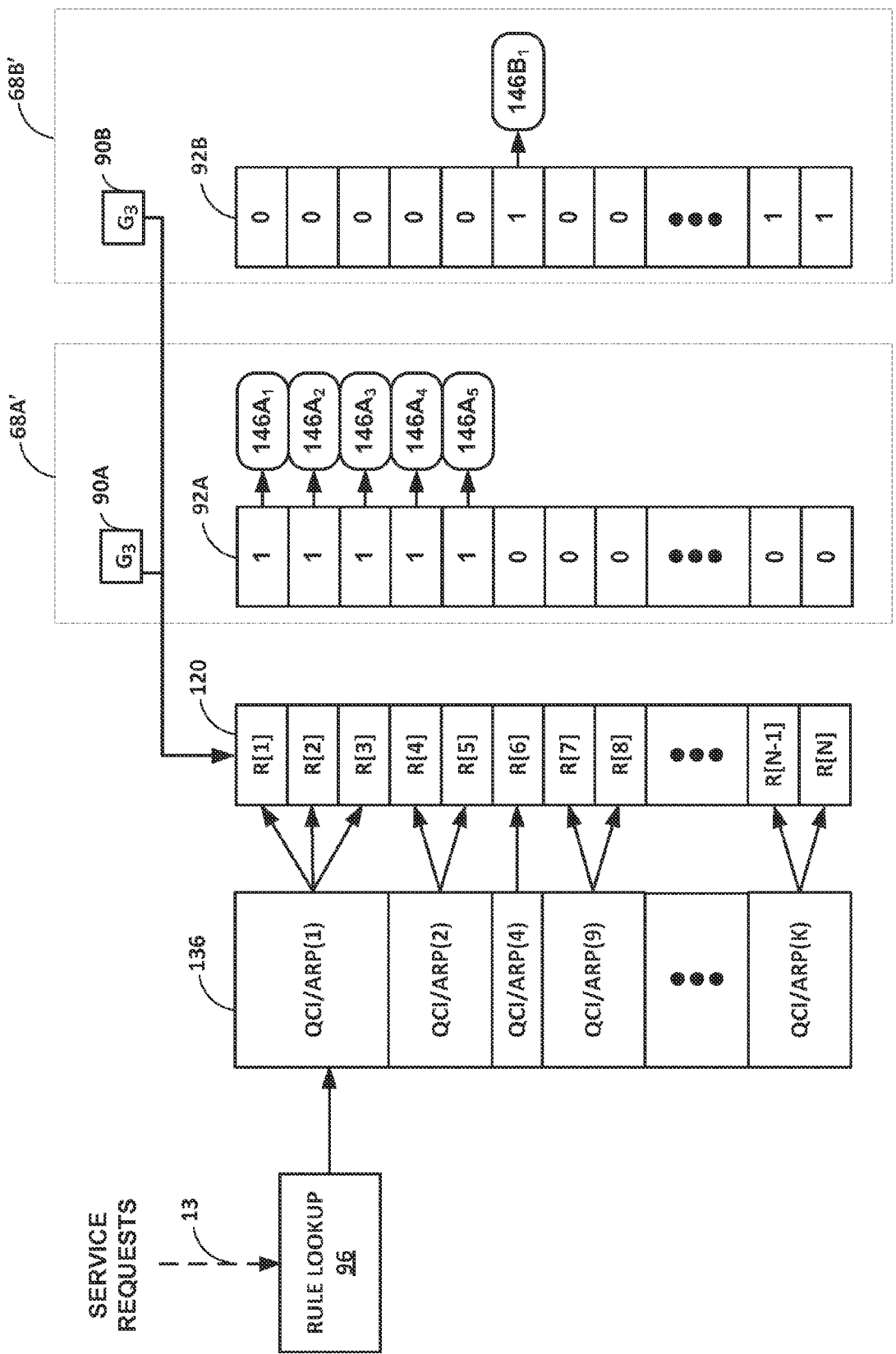
FIG. 4 is a block diagram illustrating example data structures of a local quality of service (QoS) policy, a group data store, and session contexts for performing pre-defined PCC rule programming and lookup in conformity with techniques described herein.

FIG. 4 is a block diagram illustrating example data structures of a local QoS policy, a group data store, and session contexts for performing pre-defined PCC rule programming and lookup in conformity with techniques described herein. Local QoS policy 64 of FIGS. 2-3 may include QoS profile rule map 136 that maps each of one or more QoS profiles to one or more PCC rules. In the illustrated example, QoS profile rule map 136 is an associative data structure having entries for each of the QoS profiles defined by local QoS policy 64. Each of the QoS profiles, in this example, is defined as a different combination of QCI/ARP values for bearers to carry the service data flows corresponding to rules mapped by QoS profile rule map 136. For example, the entry QoS profile rule map 136 specifying the QoS profile QCI/ARP(1) combination species PCC rules R[1], R[2], and R[3].

Local QoS policy 64 also specifies one or more pre-defined PCC rules. Subscriber management daemon 54 sends the pre-defined PCC rules as rule set 120 to forwarding unit 60, which returns a group index and group PCC rule map. Subscriber management daemon 54 stores the group index and group PCC rule map to group datastore 80. For each of illustration, the group PCC rule map is shown combined with rule set 120 to illustrate an array of PCC rules R[1] through R[N].

Subscriber management daemon 54 receives service requests 13 each specifying one or more requested services for addition or modification in a CAN session. Responsive to a service request for the CAN session associated with session context 68A', rule lookup module 96 maps QoS profiles for two requested services to QCI/ARP(1) and QCI/ARP(2) based on the respective combinations of QCI/ARP values for requested services. QCI/ARP(1) and QCI/ARP(2) map to R[1]-R[5] of rule set 120 (and the corresponding elements of the group PCC rule map). Subscriber management daemon 54 generates PCC rule map 92A and binds corresponding active PCC rules to objects 146A$_1$-146A$_5$ in ASICs 84 that represent actions for application to respective service data flows for the corresponding PCC rules. Group index 90A identifies rule set 120 as programmed in ASICs 84.

Likewise, responsive to a service request for the CAN session associated with session context 68B', rule lookup module 96 maps QoS profiles for a requested service to QCI/ARP(4) based on the combination of QCI/ARP values for the requested service. QCI/ARP(4) maps to R[6] of rule set 120 (and the corresponding element of the group PCC rule map). Subscriber management daemon 54 generates PCC rule map 92B and binds corresponding active PCC rule to objects 146B$_1$ in ASIC's 84 that represents an action for application to service data flow for the PCC rule. Group index 90B identifies rule set 120 as programmed in ASICs 84. Subscriber management daemon 54 programs session contexts 68A', 68B' in ASICs 84.

Figure 5:
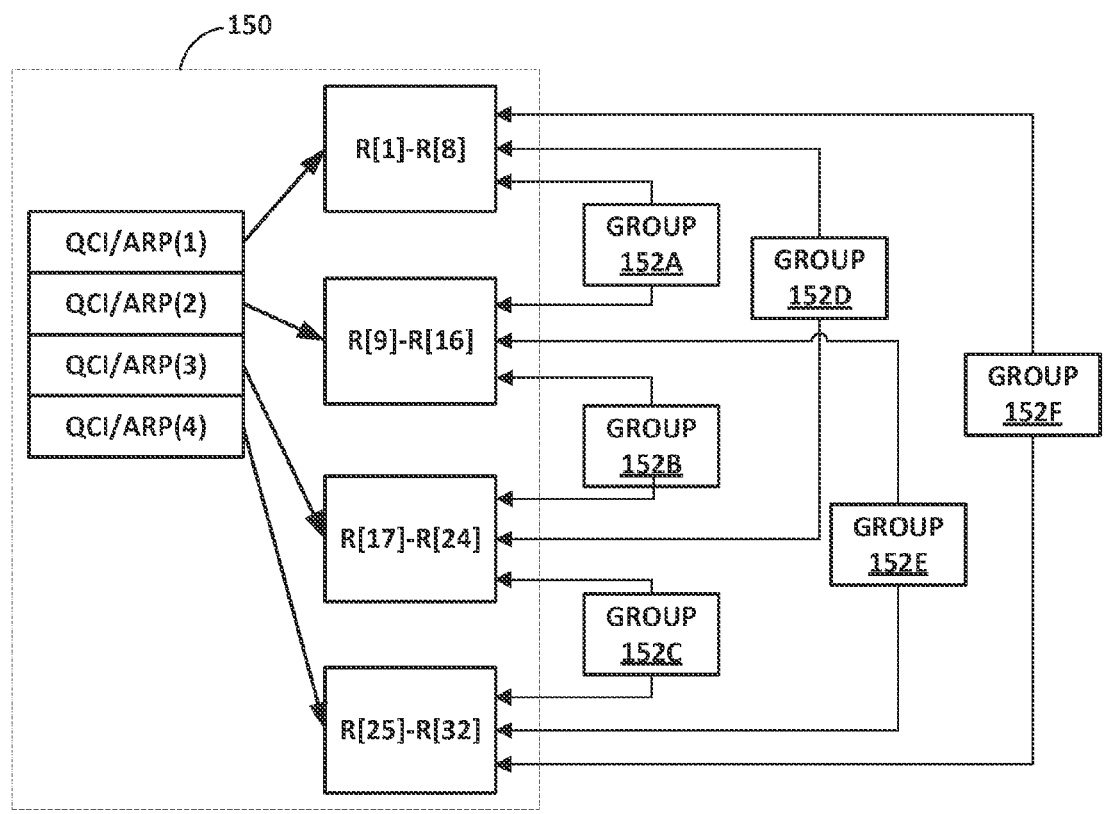
FIG. 5 is a block diagram illustrating relationships between an example of a QoS profile rule map of a local QoS policy and groups identifying rule sets.

FIG. 5 is a block diagram illustrating relationships between an example of a QoS profile rule map of a local QoS policy and groups identifying rule sets. In some example, a size of a set of PCC rules associated with any one group index in forwarding unit 60 is subject to an upper bound. In some cases, the number of PCC rules specified for an APN by a local QoS policy exceeds this upper bound. In such cases, subscriber management daemon 54 may program different combinations of rule sets for different combinations of QoS profiles. Gateway 8 may as a result accommodate commonly requested service combinations using techniques described in this disclosure.

In this example, QoS profile rule map 150 includes four QoS profiles each mapping to a subset of pre-defined PCC rules R[1]-R[32] for an APN. Subscriber management daemon 54 programs six rule sets as groups 152A-152F (collectively, "groups 152") in forwarding unit 60. Each group includes a different combination of the subsets of pre-defined PCC rules mapped to the four QoS profiles. For example, group 152E is associated with R[9]-R[16] and R[25]-R[32]. A service request that includes requests for services matching QCI/ARP(2) and QCI/ARP(4), therefore, may have policy and charging control implemented in part by an association to group 152E.

The combinations of subsets of pre-defined PCC rules mapped to the four QoS profiles are not limited to pairs of subsets. For example, to accommodate more services with a particular group, the local QoS policy configured by specify fewer rules per service (e.g., per QoS profile in QoS profile rule map). In addition, in some examples, gateway 8 includes a configurable filter limit that places a bound on the number of groups that may be pre-programmed into forwarding unit 60 to avoid programming an excessive number of filters in different combinations of subsets of the pre-defined PCC rules.

Figure 6:
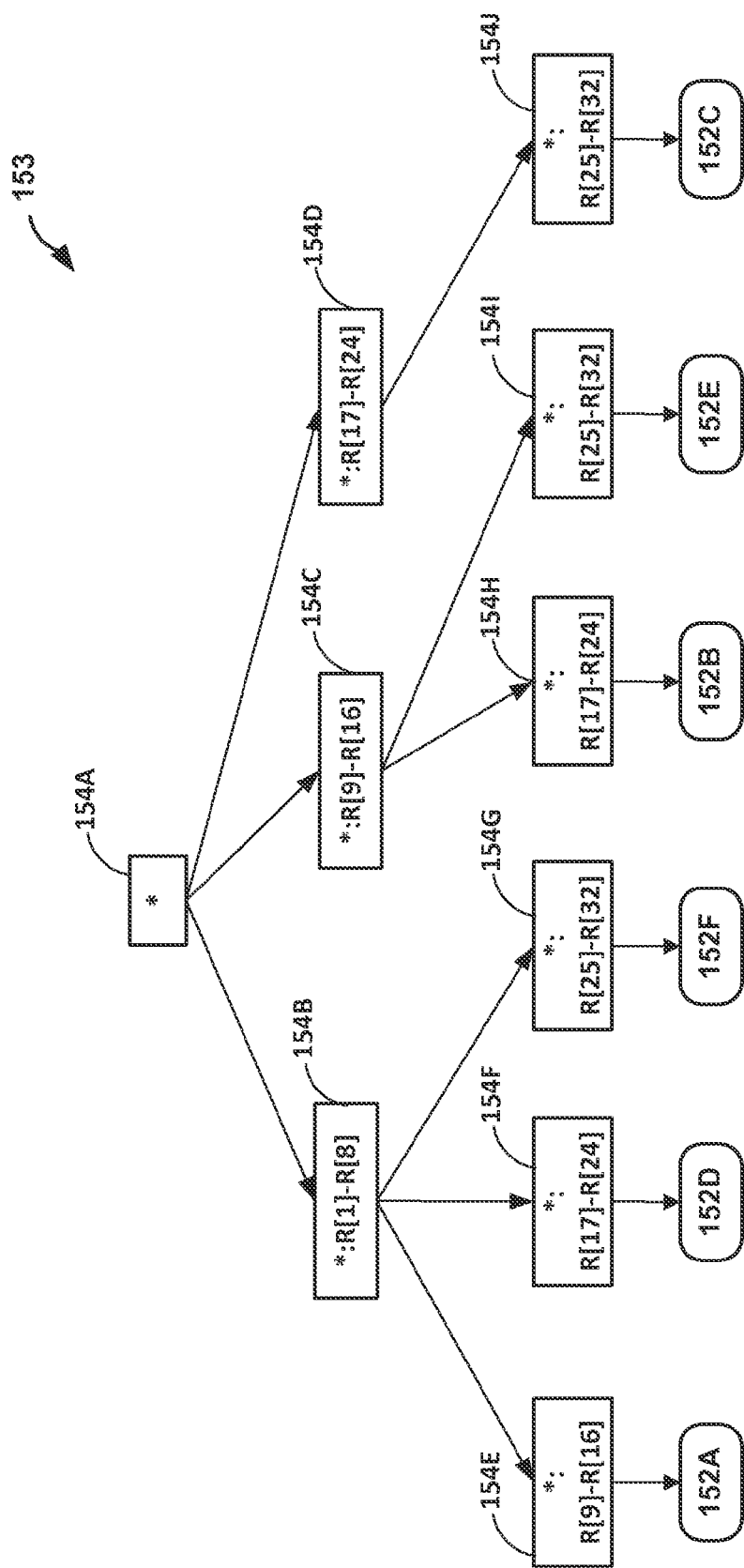
FIG. 6 is a block diagram illustrating an example data structure, usable by a rule lookup module, with which to identify a group that satisfies a required set of PCC rules for one or more requested services for a connectivity access network session.

FIG. 6 is a block diagram illustrating an example data structure, usable by a rule lookup module, with which to identify a group that satisfies a required set of PCC rules for one or more requested services for a CAN session. Lookup tree 153 in this example includes a radix tree having nodes 154A-154J (collectively, "nodes 154") that define rule set prefixes for different combinations of a set of pre-defined PCC rules programmed to the forwarding plane in accordance with the techniques described above. Node keys and values correspond to the relationships illustrated in FIG. 5.

Each leaf node of lookup tree 153 (i.e., nodes 154E-154J) has a key that is a concatenation of the PCC rules that are a part of the rule set for the value of the leaf node. The value of the each leaf node may specify a group index for a group in datastore 80. For example, leaf node 154G specifying group 152F has key *:R[25]-R[32] and inherits from node 154B having key *:R[1]-R[8], which itself inherits from node 154A having key *. The leaf node 154G is thus a concatenation of rules, specifically, R[1]-R[8]:R[25]-R[32]. Upon rule lookup module 96 determining this set of PCC rules for a CAN session, rule lookup module 96 may traverse lookup tree 153, beginning at root node 154A, to reach leaf node 154G and return a group index value for group 152F to subscriber management daemon 54. Subscriber management daemon 54 may then generate a PCC rule map and install a session context that includes the group index value and the generated PCC rule map.

Figure 7:
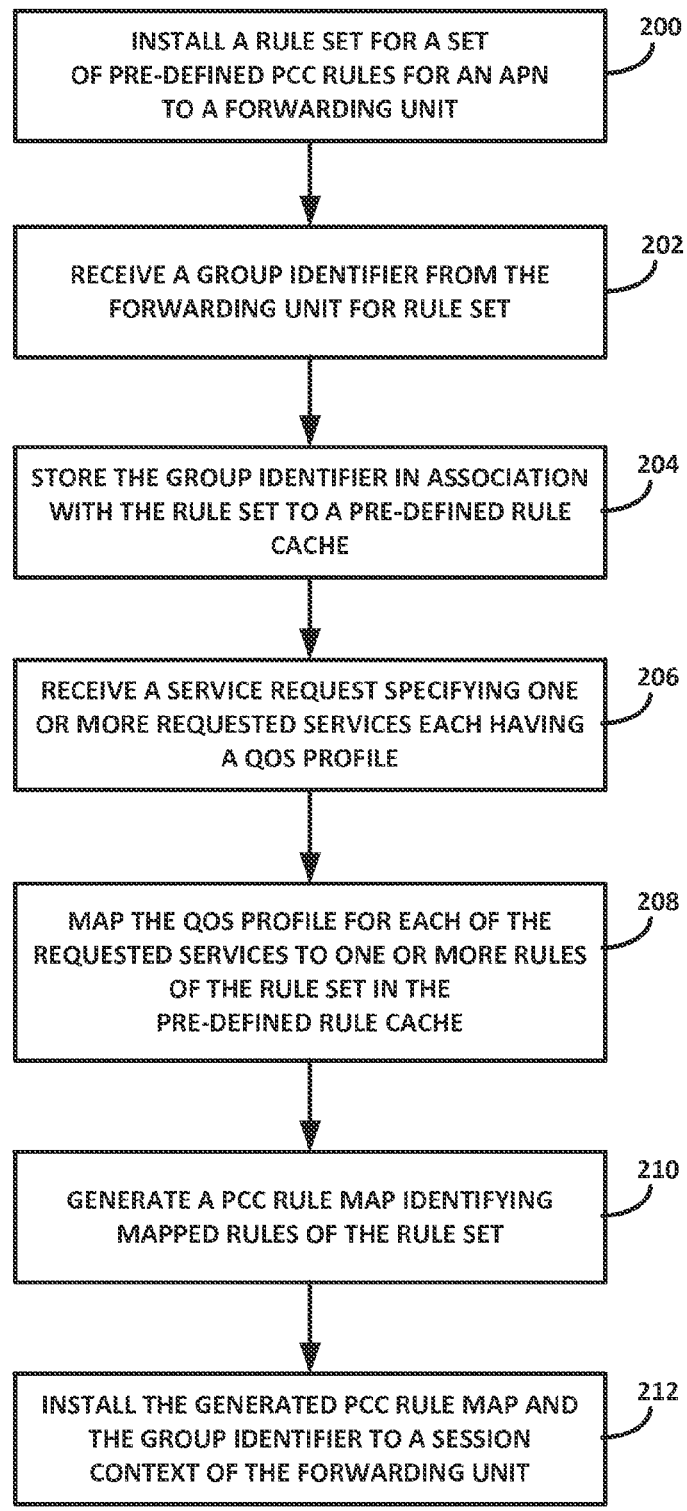
FIG. 7 is a flowchart illustrating an example mode of operation for a service unit or other control plane component to pre-program pre-defined PCC rules for cached lookup and binding according to the described techniques.

FIG. 7 is a flowchart illustrating an example mode of operation for a service unit or other control plane component to install pre-defined PCC rules for cached lookup and binding according to the described techniques. This example mode is described with respect to example subscriber management daemon of FIG. 3. Initially, subscriber management daemon 54 issues a create rule set message to forwarding unit 60 that includes rule set 118 specifying a set of pre-defined PCC rules for an APN for which gateway 8 provides connectivity (200). Forwarding unit 60 installs the rule set and returns a corresponding group identifier, which subscriber management daemon 54 receives (202). Subscriber management daemon 54 caches rule set 118 by storing the group identifier in association with rule set 118 in group datastore 80 of pre-defined rule cache 18 (204).

Subsequently, subscriber management daemon 54 receives a service request that includes requests for one or more services each having a QoS profile that defines QoS parameters for a satisfactory bearer for the service data flow (206). Rule lookup module 96 queries local QoS policy 64 to map the QoS profile for each of the requested services to one or more PCC rules and to identify rule set 118 cached to pre-defined rule cache 18 as including each of the mapped PCC rules (208). Subscriber management daemon 54 generates a PCC rule map identifying PCC rules of rule set 118 mapped to the requested services (210) and installs the PCC rule map and the group identifier for rule set 118 to a session context in forwarding unit 60 (212). Forwarding unit 60 may then apply the PCC rules identified by the group identifier and the PCC rule map to enforce QoS, gating, and/or charging control for the CAN session of the session context.

Various embodiments of the invention have been described. These and other embodiments are within the scope of the following claims.

What is claimed is:

1. A method comprising:
installing, with a service unit within a gateway of a wireless connectivity access network that provides connectivity to an access point name of a packet data network, a rule set to a forwarding unit within the gateway, wherein the rule set comprises a set of one or more pre-defined policy and charging control (PCC) rules for the access point name;
receiving, with the service unit in response to installing the rule set, a group identifier for the rule set from the forwarding unit;
receiving, with the service unit after installing the rule set to the forwarding unit and receiving the group identifier from the forwarding unit, a service request issued by a wireless device associated with a subscriber, wherein the service request specifies a requested service for a connectivity access network session for the subscriber; and
installing, with the service unit to a session context of the forwarding unit, the group identifier and a rule map that together identify a subset of the set of pre-defined PCC rules for the requested service, wherein the session context is associated with the connectivity access network session for the subscriber.

2. The method of claim 1, further comprising:
mapping, with the service unit, the requested service to the subset of the set of pre-defined PCC rules; and
determining, with the service unit, the rule set includes every PCC rule in the subset of the set of pre-defined PCC rules.

3. The method of claim 2,
wherein the service request specifies a quality of service (QoS) profile for the requested service, and
wherein mapping the requested service to a subset of the set of pre-defined PCC rules comprises querying a QoS profile rule map to map the QoS profile to the subset of the set of pre-defined PCC rules.

4. The method of claim 1, further comprising:
storing, with the service unit, a group rule map for the rule set and the group identifier to a pre-defined rule cache, wherein the group rule map identifies PCC rules of the rule set within a set of rules associated by the forwarding unit with the group identifier; and
generating, with the service unit, the rule map to identify the subset of the set of pre-defined PCC rules within the group rule map.

5. The method of claim 4, further comprising:
mapping, with the service unit, the requested service to the subset of the set of pre-defined PCC rules; and
determining, with the service unit, the rule set includes every PCC rule in the subset of the set of pre-defined PCC rules by querying the pre-defined rule cache to determine the group rule map identifies every PCC rule in the subset of the set of pre-defined PCC rules.

6. The method of claim 1, further comprising:
receiving subscriber data traffic associated with the connectivity access network session with the forwarding unit; and
applying, with the forwarding unit, the subset of the set of pre-defined PCC rules identified by the group identifier and the rule map to the subscriber data traffic and forwarding the subscriber data traffic on one or more bearers mapped to the subset of the set of pre-defined PCC rules.

7. The method of claim 1, further comprising:
installing a plurality of rule sets to the forwarding unit, wherein the each of the plurality of rule sets comprises a different subset of the set of pre-defined PCC rules for the access point name, and wherein the rule set is a first rule set in the plurality of rule sets; and
receiving, with the service unit, a plurality of group identifiers for the respective rule sets from the forwarding unit, wherein the group identifier is a first group identifier in the plurality of group identifiers.

8. The method of claim 7,
wherein the service request specifies one or more requested services for the connectivity access network session for the subscriber, wherein the one or more requested services comprises the requested service, the method further comprising:
mapping, with the service unit, the requested services to the subset of the set of pre-defined PCC rules;
identifying, with the service unit, the first rule set that includes every PCC rule in the subset of the set of pre-defined PCC rules; and
installing, with the service unit, the first group identifier for the first rule set and a rule map that together identify the subset of the set of pre-defined PCC rules within the first rule set to the session context of the forwarding unit.

9. The method of claim 8, further comprising:
generating, with the service unit, a radix lookup tree comprising one or more nodes, wherein the nodes comprise one or more leaf nodes, wherein each the leaf nodes specifies a key that is a concatenation of PCC rule identifiers and a value that is one of the plurality of group identifiers, wherein identifying the first one of the rule sets that includes every PCC rule in the subset of the set of pre-defined PCC rules comprises traversing the radix lookup tree using a concatenation of the subset of the set of pre-defined PCC rules to match a key of a first one of the leaf nodes and obtaining the first group identifier that is a value specified by the first leaf node.

10. The method of claim 1, further comprising:
sending a create rule set message that include the rule set from the service unit to the forwarding unit; and
receiving a create rule set response message issued by the forwarding unit with the service unit, wherein the create rule set response message includes the group identifier for the rule set and a group rule map for the rule set, wherein the group rule map identifies PCC rules of the rule set within a set of rules associated by the forwarding unit with the group identifier.

11. The method of claim 1, wherein installing the group identifier and the rule map comprises installing, with the service unit to the session context of the forwarding unit and after determining the group identifier based at least on a pre-defined rule cache stored to the service unit, the group identifier and the rule map.

12. A wireless connectivity access network gateway that provides connectivity to an access point name of a packet data network, the gateway comprising:
a forwarding unit;
a session context stored by the forwarding unit and associated with a connectivity access network session for a subscriber; and
a service unit that stores a local quality of service (QoS) policy comprising a set of one or more pre-defined policy and charging control (PCC) rules for the access point name,
wherein the service unit installs, to the forwarding unit, a rule set comprising the set of pre-defined PCC rules,
wherein the service unit receives, in response to installing the rule set, a group identifier for the rule set from the forwarding unit; and
a subscriber management daemon of the service unit that receives, after the service unit installs the rule set to the forwarding unit and receives the group identifier from the forwarding unit, a service request issued by a wireless device associated with the subscriber and specifying a requested service for the connectivity access network session,
wherein the subscriber management daemon of the service unit installs, to the session context, the group identifier and a rule map that together identify a subset of the set of pre-defined PCC rules for the requested service.

13. The gateway of claim 12,
wherein the subscriber management daemon maps the requested service to the subset of the set of pre-defined PCC rules, and
wherein the subscriber management daemon determines the rule set includes every PCC rule in the subset of the set of pre-defined PCC rules.

14. The gateway of claim 12, further comprising:
a QoS profile rule map of the local QoS policy that maps a QoS profile to the subset of the set of pre-defined PCC rules,
wherein the service request specifies a QoS profile for the requested service, and
wherein the subscriber management daemon queries the QoS profile rule map to map the QoS profile to the subset of the set of pre-defined PCC rules.

15. The gateway of claim 12, further comprising:
a pre-defined rule cache, stored by the service unit, that comprises a group rule map for the rule set and the group identifier, wherein the group rule map identifies PCC rules of the rule set within a set of rules associated by the forwarding unit with the group identifier,
wherein the subscriber management daemon generates the rule map to identify the subset of the set of pre-defined PCC rules within the group rule map.

16. The gateway of claim 15,
wherein the subscriber management daemon maps the requested service to the subset of the set of pre-defined PCC rules, and
wherein the subscriber management daemon determines the rule set includes every PCC rule in the subset of the set of pre-defined PCC rules by querying the pre-defined rule cache to determine the group rule map identifies every PCC rule in the subset of the set of pre-defined PCC rules.

17. The gateway of claim 12,
wherein the forwarding unit receives subscriber data traffic associated with the connectivity access network session;
a packet processor of the forwarding unit that applies the subset of the set of pre-defined PCC rules identified by the group identifier and the rule map to the subscriber data traffic and forwards the subscriber data traffic on one or more bearers mapped to the subset of the set of pre-defined PCC rules.

18. The gateway of claim 12,
wherein the service unit installs a plurality of rule sets to the forwarding unit, wherein the each of the plurality of rule sets comprises a different subset of the set of pre-defined PCC rules for the access point name, and wherein the rule set is a first rule set in the plurality of rule sets,
wherein the service unit receives a plurality of group identifiers for the respective rule sets from the forwarding unit, wherein the group identifier is a first group identifier in the plurality of group identifiers.

19. The gateway of claim 18,
wherein the service request specifies one or more requested services for the connectivity access network session for the subscriber, wherein the one or more requested services comprises the requested service,
wherein the subscriber management daemon maps the requested services to the subset of the set of pre-defined PCC rules,
wherein the subscriber management daemon identifies the first rule set that includes every PCC rule in the subset of the set of pre-defined PCC rules and installs the first group identifier for the first rule set and a rule map that together identify the subset of the set of pre-defined PCC rules within the first rule set to the session context of the forwarding unit.

20. The gateway of claim 19, further comprising:
a radix lookup tree comprising one or more nodes, wherein the nodes comprise one or more leaf nodes, wherein each the leaf nodes specifies a key that is a concatenation of PCC rule identifiers and a value that is one of the plurality of group identifiers,
wherein the subscriber management daemon identifies the first rule set that includes every PCC rule in the subset of the set of pre-defined PCC rules by traversing the radix lookup tree using a concatenation of the subset of the set of pre-defined PCC rules to match a key of a first one of the leaf nodes and obtaining the first group identifier that is a value specified by the first leaf node.

21. The gateway of claim 12,
wherein the service unit sends a create rule set message that include the rule set to the forwarding unit, and
wherein the service unit receives a create rule set response message issued by the forwarding unit, wherein the create rule set response message includes the group identifier for the rule set and a group rule map for the rule set, wherein the group rule map identifies PCC rules of the rule set within a set of rules associated by the forwarding unit with the group identifier.

22. The gateway of claim 12, wherein to install the group identifier and a rule map the subscriber management daemon of the service unit installs, to the session context of the forwarding unit and after determining the group identifier based at least on a pre-defined rule cache stored to the service unit, the group identifier and the rule map.

23. A non-transitory computer-readable medium comprising instructions for causing one or more programmable processors to:
    install, with a service unit within a gateway of a wireless connectivity access network that provides connectivity to an access point name of a packet data network, a rule set to a forwarding unit within the gateway, wherein the rule set comprises a set of one or more pre-defined policy and charging control (PCC) rules for the access point name;
    receive, with the service unit in response to installing the rule set, a group identifier for the rule set from the forwarding unit;
    receive, with the service unit after installing the rule set to the forwarding unit and receiving the group identifier from the forwarding unit, a service request issued by a wireless device associated with a subscriber, wherein the service request specifies a requested service for a connectivity access network session for the subscriber; and
    install, with the service unit to a session context of the forwarding unit, the group identifier and a rule map that together identify a subset of the set of pre-defined PCC rules for the requested service, wherein the session context is associated with the connectivity access network session for the subscriber.

* * * * *